J. Barnard,
Hanging Saws,
N° 46,325. Patented Feb. 14, 1865.
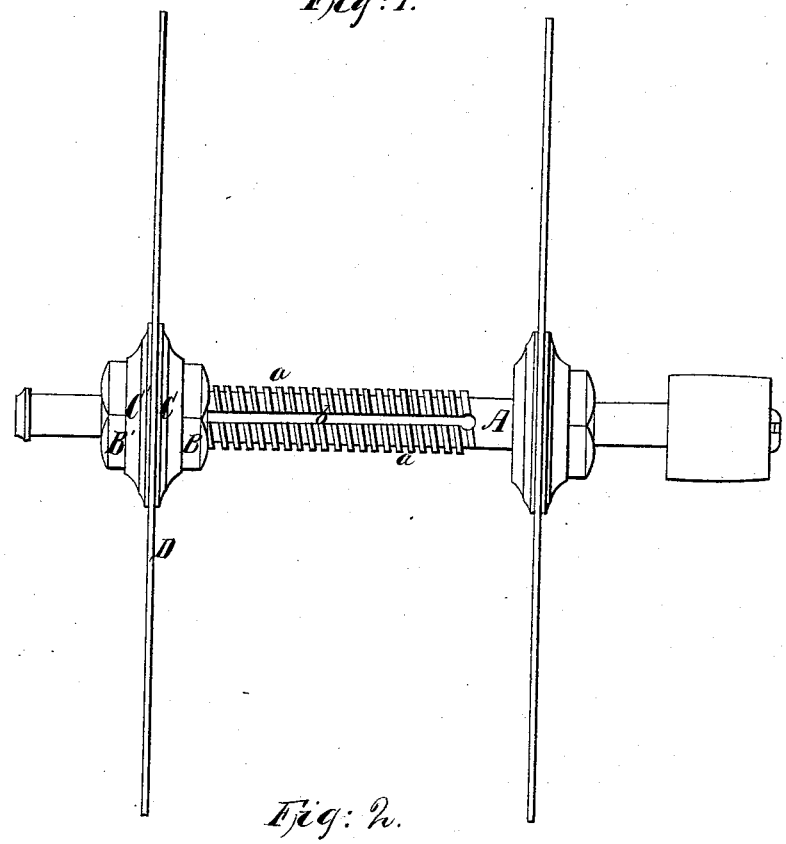
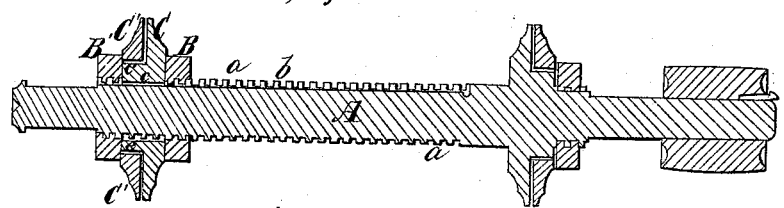
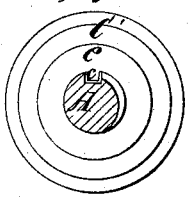
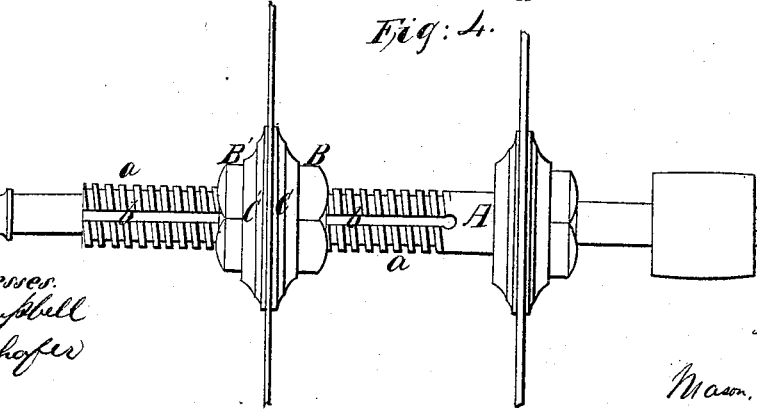
Witnesses.
R. T. Campbell
E. Schafer
Inventor.
John Barnard
By his Atty's
Mason, Fenwick & Lawrence

UNITED STATES PATENT OFFICE.

JOHN BARNARD, OF ALTON, ILLINOIS.

IMPROVEMENT IN MODE OF ADJUSTING CIRCULAR SAWS ON THEIR ARBORS.

Specification forming part of Letters Patent No. 46,325, dated February 14, 1865.

*To all whom it may concern:*

Be it known that I, JOHN BARNARD, of Alton, county of Madison, and State of Illinois, have invented a new and Improved Mode of Adjusting Circular Saws; and I do hereby declare that the following is a full, clear, and exact description thereof, reference being had to the accompanying drawings, making a part of this specification, in which—

Figure 1 represents two saws applied to a saw-arbor in the approved manner. Fig. 2 is a diametrical section through Fig. 1 without the saws. Fig. 3 is a cross-section through the arbor, showing the manner of preventing the collars and flanges from turning on the same. Fig. 4 shows one of the saws adjusted and set near the middle of its arbor.

Similar letters of reference indicate corresponding parts in the several figures.

The main object of this invention is to so apply circular saws on their arbors, that a lateral adjustment of the saws can be readily and accurately effected without removing them from between their collars.

Another object of my invention is to so construct the collars between which circular-saws are clamped that the saws will be centered and will have their bearings on hubs formed on one of said collars, instead of upon the arbor on which the collars are fitted, all as will be hereinafter described.

To enable others skilled in the art to make and use my invention, I will describe its construction and operation.

In the accompanying drawings, A represents a saw-arbor which has a screw-thread, *a*, cut on it for the purpose of receiving two clamping and adjusting nuts, B B'. The length of this screw thread, *a*, will vary according to the amount of lateral adjustment it is desired to give the saw. The screw-thread *a* is intersected by a longitudinal groove, *b*, which is intended to receive a feather, *c*, that projects from the bore of a flanged hub or collar, C, and thus allow said collar to be moved freely in a direction with the length of its arbor, while it is prevented by the feather from turning around on its arbor.

C C' are two clamping-collars, between which the saw D is confined, as shown in Figs. 1 and 4. The collar C is formed on a hub, *e*, and the collar C' fits over this hub and is thus brought up closely to the saw, which is previously slipped over the hub and brought up against the collar C. The length of the hub *e* is such as will allow the set-screw B' to force the collar C' up closely against the saw and confine it in place between the two collars.

In applying the saw to its arbor A the nut B is screwed on this arbor first, then the collar C is slipped on, after which the saw is confined between the two collars C C', and the whole rigidly secured on the arbor by setting up the nut B'.

To adjust the saw D on its arbor it is only necessary to loosen one of the nuts, adjust the collars, with the saw between them, and set up the opposite nut so as to confine the whole in place, as above described.

By this simple device a saw can be adjusted accurately and quickly from one point to another on its arbor, and secured rigidly thereto at any desired point, using for this purpose a simple wrench to turn the nuts and set them up against their respective collars.

By providing one of the collars with a hub, the saw will not be affected by the screw-thread on the arbor, as it will have an independent bearing upon said hub, which will keep the eye of the saw free from this thread and admit of the saw being adjusted without loosening it from between its collars.

Having thus fully described my invention, what I claim, and desire to secure by Letters Patent, is—

1. So applying a saw to an arbor having a screw-thread cut on it that the saw, together with its clamping-collars, can be adjusted and set at any desired point on the arbor, substantially as described.

2. The combination of laterally-adjustable clamping-collars C C' with jamb-nuts B B, when the latter are fitted to work on an arbor having a screw-thread cut on it, substantially as herein described.

JOHN BARNARD.

Witnesses:
T. SOUTHWORTH,
JAMES PATTERSON.